United States Patent

Turner

(10) Patent No.: US 9,434,251 B2
(45) Date of Patent: Sep. 6, 2016

(54) ALL-WHEEL DRIVE FAILSAFE ACTION AXLE TORQUE CALCULATION METHOD

(71) Applicant: Honda Motor Co., Ltd., Tokyo (JP)

(72) Inventor: Steve Turner, Marysville, OH (US)

(73) Assignee: Honda Motor Co., Ltd., Tokyo (JP)

(*) Notice: Subject to any disclaimer, the term of this patent is extended or adjusted under 35 U.S.C. 154(b) by 1 day.

(21) Appl. No.: 14/333,634

(22) Filed: Jul. 17, 2014

(65) Prior Publication Data

US 2016/0016466 A1   Jan. 21, 2016

(51) Int. Cl.
| | | |
|---|---|---|
| *G06F 7/00* | (2006.01) | |
| *G05D 1/00* | (2006.01) | |
| *B60T 7/12* | (2006.01) | |
| *B60K 23/08* | (2006.01) | |
| *F02D 41/02* | (2006.01) | |
| *F02D 29/02* | (2006.01) | |

(52) U.S. Cl.
CPC ......... B60K 23/0808 (2013.01); F02D 41/021 (2013.01); *B60K 2023/085* (2013.01); *F02D 29/02* (2013.01); *F02D 2250/26* (2013.01)

(58) Field of Classification Search
USPC .................. 701/1, 87, 88, 89, 90, 91, 92
See application file for complete search history.

(56) References Cited

U.S. PATENT DOCUMENTS

| | | | | |
|---|---|---|---|---|
| 5,032,995 A | | 7/1991 | Matsuda et al. | |
| 5,032,997 A | * | 7/1991 | Kawagoe | B60G 17/0163 180/404 |
| 5,056,614 A | * | 10/1991 | Tokushima | B60K 23/0808 180/248 |
| 5,170,343 A | * | 12/1992 | Matsuda | B60G 17/0185 700/79 |
| 5,215,161 A | * | 6/1993 | Kobayashi | B60K 17/35 180/248 |
| 5,418,727 A | * | 5/1995 | Ikeda | B60K 31/0008 340/438 |
| 5,611,407 A | * | 3/1997 | Maehara | B60K 23/0808 180/248 |
| 5,740,042 A | * | 4/1998 | Fujioka | B60K 28/16 180/197 |
| 5,813,490 A | * | 9/1998 | Takasaki | B60K 23/0808 180/249 |
| 5,819,194 A | * | 10/1998 | Hara | B60K 23/0808 180/233 |
| 5,947,221 A | * | 9/1999 | Taniguchi | B60T 8/4872 180/197 |
| 5,951,428 A | * | 9/1999 | Itoh | B60K 17/344 192/48.91 |
| 6,016,883 A | * | 1/2000 | Yamada | B60K 23/08 180/233 |
| 6,496,769 B1 | | 12/2002 | O'Dea | |
| 6,842,682 B2 | | 1/2005 | Wakao et al. | |
| 7,033,303 B2 | * | 4/2006 | Takasaki | F16H 61/2807 475/199 |
| 7,634,342 B2 | | 12/2009 | Post, II | |
| 7,680,576 B2 | | 3/2010 | Nagura et al. | |
| 8,095,288 B2 | | 1/2012 | Bruns et al. | |
| 8,332,112 B2 | | 12/2012 | Handa et al. | |
| 8,505,669 B2 | | 8/2013 | Ueda et al. | |
| 2001/0027907 A1 | * | 10/2001 | Nishida | F16D 27/112 192/84.1 |
| 2013/0054105 A1 | | 2/2013 | Febrer et al. | |

FOREIGN PATENT DOCUMENTS

JP          04257742          9/1992

* cited by examiner

*Primary Examiner* — Bhavesh V Amin
(74) *Attorney, Agent, or Firm* — Rankin, Hill & Clark LLP

(57) ABSTRACT

A method of controlling an all-wheel drive system of a vehicle includes supplying torque to front and rear wheels of the vehicle, sensing a failure of the all-wheel drive system, and adjusting a crankshaft torque of an engine of the vehicle so that the front wheel torque remains constant regardless of a failure of the all-wheel drive system.

16 Claims, 3 Drawing Sheets

ALL-WHEEL DRIVE FAILSAFE ACTION AXLE TORQUE CALCULATION METHOD

BACKGROUND

An all-wheel drive system can provide increased traction and stability for the vehicle. However, whenever there is a failure of the all-wheel drive system, the vehicle may revert back to a front-wheel drive system. Thus, the torque supplied to the rear wheels is then redistributed to the front wheels, which can cause an increased amount of torque to be supplied to the front wheels. Therefore it is important to determine how the torque should be limited to provide a smooth operation of the vehicle in the event of a failure of the all-wheel drive system.

SUMMARY

According to one aspect, a method of controlling an all-wheel drive system of a vehicle includes supplying torque to front and rear wheels of the vehicle, sensing a failure of the all-wheel drive system, and adjusting a crankshaft torque of an engine of the vehicle so that the front wheel torque remains constant regardless of a failure of the all-wheel drive system.

According to another aspect, a method of controlling a vehicle with an all-wheel drive system includes sensing a gear position of a transmission of the vehicle, supplying torque of a crankshaft of an engine to front wheels and rear wheels of the vehicle, and sensing a rotational speed of the crankshaft. The method also includes detecting whether there is a failure of the all-wheel drive system, and limiting the supplied torque to the front wheels for a predetermined time period after a failure of the all-wheel drive system is detected. The limited torque supplied to the front wheels is based upon the gear position of the transmission and the rotational speed of the crankshaft.

According to a further aspect, a vehicle includes an all-wheel drive system that includes an engine that outputs crankshaft torque through a crankshaft, a transmission that is coupled to the engine and supplies front wheel torque to front wheels of the vehicle, a propeller shaft rotated by the transmission, and a rear differential unit powered by the propeller shaft and supplies rear wheel torque to rear wheels of the vehicle. The vehicle also includes a controller that controls operation of the all-wheel drive system and is configured to receive signals indicative of a failure of the all-wheel drive system. The controller is configured to adjust the crankshaft torque upon receiving a failure signal so that the front wheel torque remains constant during a predetermined time period in which the failure of the all-wheel drive system occurs.

DETAILED DESCRIPTION

Figure 1:
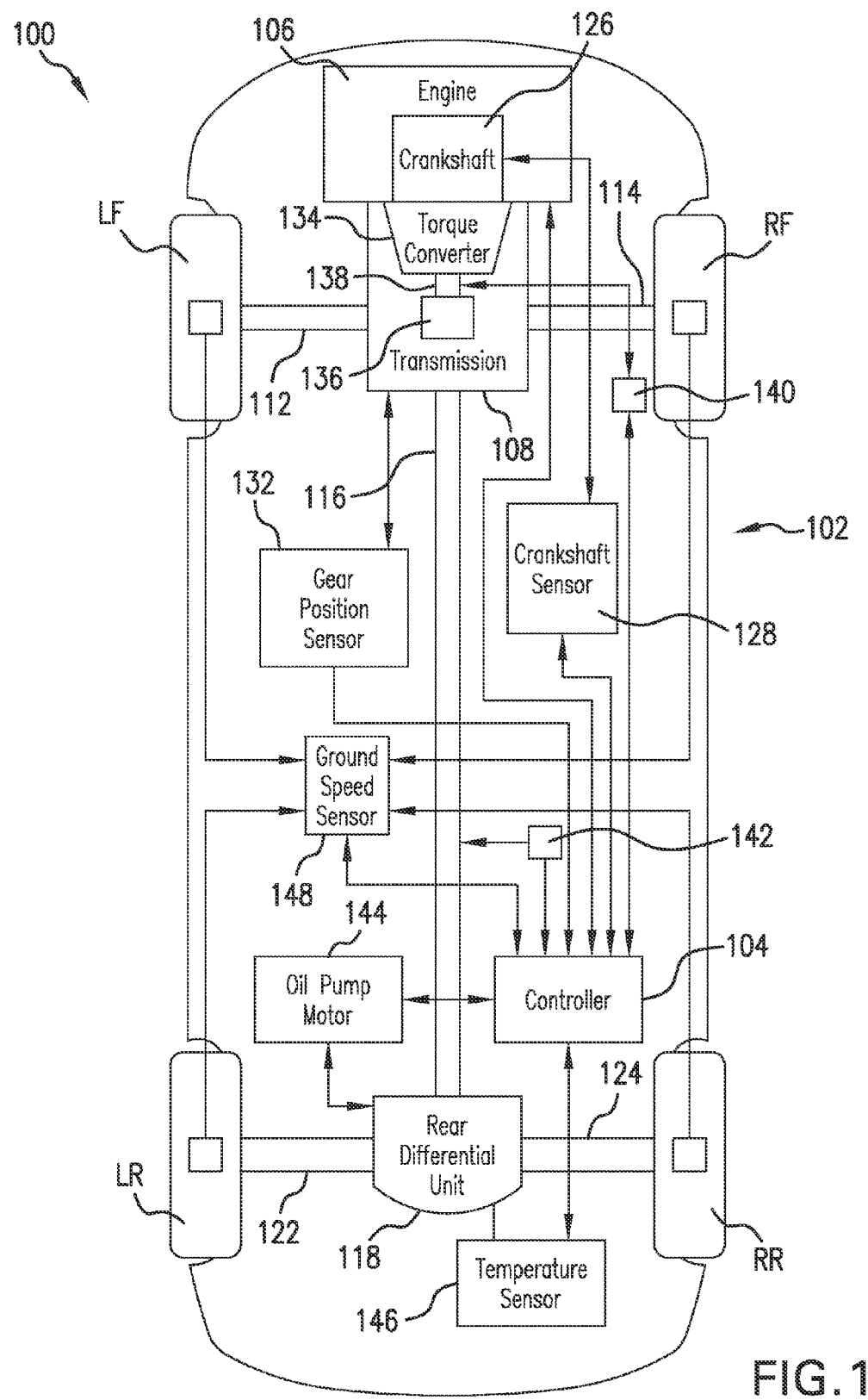
FIG. 1 is a schematic plan view of a vehicle.

It should, of course, be understood the drawing and description herein are merely illustrative and that various modifications and changes can be made in the structures disclosed without departing from the present disclosure. It will be appreciated that the various identified components of the vehicle disclosed herein are merely terms of art that may vary from one manufacturer to another and should not be deemed to limit the present disclosure.

Referring now to FIG. 1, a vehicle 100 includes an all-wheel drive system 102 that is controlled by a controller 104 to distribute torque from an engine 106 to both front wheels LF, RF and rear wheels LR, RR coupled to the engine 106. The engine torque is initially supplied to a transmission 108 that provides speed and torque conversions and then transmits the torque to the front wheels LF, RF through front axles 112, 114. The front axles 112, 114 extend in a lateral direction of the vehicle 100. Suspension and brake components, although not illustrated, can be connected to the front axles 112, 114. Additionally, the transmission 108 supplies torque to a propeller shaft 116. The propeller shaft 116 powers a rear differential unit 118. The rear differential unit 118 then supplies torque to the rear wheels LR, RR through rear axles 122, 124.

The vehicle 100, as depicted in FIG. 1, could be any number of vehicles. In particular, the vehicle 100 can be an automobile, a truck, a van, or variants thereof. Further, it will be appreciated that the later described elements and methods could be employed in many other types of vehicles including motorcycles and commercial vehicles without departing from the scope of the disclosure.

The engine 106 schematically depicted in FIG. 1 can be of a single cylinder or multi-cylinder arrangement. Further, the engine 106 can be powered by any number of fuels including, for example, gasoline, diesel, and natural gas. Further still, the engine 106 could be powered by a single fuel or by a plurality of fuels. Additionally, the engine 106 can be of a hybrid-type arrangement. The engine 106 may operate in ranges from approximately 600 revolutions per minute to over 7,000 revolutions per minute, if fueled by gasoline. Naturally, if the engine 106 were fueled by diesel, lower operating ranges would be expected. Although the engine 106 is illustrated as being disposed in a front part of the vehicle 100, it is envisioned that the engine 106 could be located in other parts of the vehicle 100 without departing from the scope of the disclosure. The engine 106 is connected to the controller 104 so that various operating parameters of the engine 106 may be monitored and controlled by the controller 104. The engine 106 may be oriented in a longitudinal or transverse position in the vehicle 100.

The engine 106 outputs torque through a crankshaft 126 as is known in the art. A crankshaft sensor 128 may be disposed near the crankshaft 126 to measure a rotational speed of the crankshaft 126. The crankshaft sensor 128 may use any number of contact or non-contact type technologies for sensing the rotational speed of the crankshaft 126. The crankshaft sensor 128 can be connected to the controller 104 for communication therebetween.

The transmission 108 can include a gear position sensor 132 which senses a gear position of the transmission 108. Naturally, the higher the gear selected for the vehicle 100, the faster of a ground speed for the vehicle is possible. The gear position sensor 132 communicates with the controller 104 as will be described hereinafter. The gear position sensor 132 may sense the gear position of the transmission 108 of the vehicle 100 by any number of techniques known in the art. The gear position sensor 132 may be proximal to the transmission 108 or may be disposed in other locations of the vehicle 100.

The transmission 108 can also include a torque converter 134. The torque converter 134 can be a type of fluid coupling that is used to transfer the torque from the engine 106 to the front and rear wheels LF, RF, LR, RR, as is known in the art. The torque converter 134 is configured to multiply torque when there is a substantial difference between input and output rotational speeds of the engine 106 and the front and rear wheels LF, RF, LR, RR. Therefore, the torque converter 134 can function as a reduction gear.

Also within the transmission 108 is a gear train 136. The gear train 136 serves to translate the rotational speed of the crankshaft 126 into a rotational speed that is acceptable for the front and rear wheels LF, RF, LR, RR. For simplicity, the gear train 136 is not illustrated in detail. However, it will be appreciated that the gear train 136 can be comprised of a plurality of gears in a known arrangement.

A connecting shaft 138 longitudinally extends between the gear train 136 and the torque converter 134 for the transmission of torque. Further, a shaft sensor 140 is disposed so as to sense a rotational speed of the connecting shaft 138. Like the crankshaft sensor 128, the shaft sensor 140 may be of a contact or non-contact type. The shaft sensor 140 is connected to the controller 104 as will be described later.

Although the transmission 108 has been described as being an automatic transmission, in view of the torque converter 134, it will be appreciated that a manual transmission could be used in place of an automatic transmission without departing from the scope of the disclosure. Further, it is envisioned that the present disclosure could also encompass a vehicle with a semi-automatic transmission in which the driver of the vehicle selects the desired gear, but the clutch is automatically engaged as needed.

As illustrated, the transmission outputs torque to a plurality of sources. Specifically, the transmission 108 outputs torque to the left front axle 112 and the right front axle 114. The transmission 108 also transmits torque to the propeller shaft 116. The propeller shaft 116 is illustrated as being located in a laterally central portion of the vehicle 100 and extends in a longitudinal direction of the vehicle 100. The propeller shaft 116 can be a torque tube with a single universal joint or a Hotchkiss drive with two or more joints. The propeller shaft 116 serves to transfer rotational energy between the transmission 108 and the rear differential unit 118. A transmission output shaft sensor 142 can be mounted near the propeller shaft 116 so as to measure a rotational speed of the propeller shaft 116. The transmission output shaft sensor 142 is connected to the controller 104. The transmission output shaft sensor 142 can also be of a contact or non-contact type, which is known in the art.

With continued attention to FIG. 1, the rear differential unit 118 receives rotational energy from the propeller shaft 116. Additionally, the rear differential unit 118 outputs torque to the left rear axle 122 and the right rear axle 124 to rotate the rear wheels LR, RR, respectively. The rear axles 122, 124 extend in the lateral direction of the vehicle 100. As will be appreciated various types of braking and suspension components could be attached to the axles 122, 124. The rear differential unit 118 can include a number of gears which are not illustrated. The rear differential unit 118 can also include a number of clutches. This arrangement allows the left rear wheel LR to spin at a different rotational rate than the right rear wheel RR.

An oil pump motor 144 can be associated with the rear differential unit 118. The oil pump motor 144 can supply fluid to the rear differential unit 118 for operational purposes. Further, the oil pump motor 144 may be connected to the controller 104 so as to allow data communication therebetween. By connecting the oil pump motor 144 to the controller 104, the controller 104 can monitor and control the oil pump motor 144 for optimal operation.

A temperature sensor 146 can be provided to the rear differential unit 118. The temperature sensor 146 can sense a temperature within the rear differential unit 118. The temperature sensor 146 is connected to the controller 104 and can provide this temperature data to the controller 104. The temperature information can be used by the controller 104 to determine if the all-wheel drive system 102 is in a failure mode. The sensor 146 can be of a contact or non-contact type.

The vehicle 100 can also include a ground speed sensor 148. As illustrated, the ground speed sensor 148 is a single component that is connected to the controller 104. However, it will be appreciated that the ground speed sensor 148 could alternatively be a number of units that are connected to the controller 104. As illustrated, the ground speed sensor 148 is connected to sense rotational speed of the front and rear wheels LF, RF, LR, RR. However, other techniques are also possible. For example, the ground speed sensor 148 could utilize various types of non-contact means for determining a speed of the vehicle 100, such as, a global positioning system module.

FIG. 1 shows the four wheels LF, RF, LR, RR disposed at near corners of the vehicle 100. However, the front and rear wheels LF, RF, LR, RR could be located laterally inward/outward and longitudinally inward/outward from the location illustrated without departing from the scope of the disclosure. It would be expected that the front and rear wheels LF, RF, LR, RR could rotate between zero and approximately 1,800 revolutions per minute. While the front wheels LF, RF are illustrated as being a same lateral distance apart as the rear wheels LR, RR, it will be appreciated that a distance between the front wheels LF, RF could be different than a distance between the rear wheels LR, RR, i.e., in a staggered arrangement.

The vehicle 100 also includes the controller 104 that among other things controls the all-wheel drive system 102. As illustrated, the controller 104 is located near a rear end of the vehicle 100. However, the controller 104 could be located in any number of places in the vehicle 100 without departing from the scope of this disclosure. The controller 104 is connected to the engine 106, the crankshaft sensor 128, the gear position sensor 132, the shaft sensor 140, the transmission output shaft sensor 142, the oil pump motor 144, the temperature sensor 146, and the ground speed sensor 148 so as to allow two way communication between the controller 104 and the described components. Further, although shown as being connected to the various components with wires, it will be understood that the controller 104 could be interfaced with the other components through a variety of other connection methods including, for example, wireless communication. The controller 104 may be any number of central processing units or programmable logic controllers.

With regard to control of the all-wheel drive system 102, the controller 104 is able to adjust the torque from the crankshaft 126 whenever the controller 104 determines that at least one component of the all-wheel drive system 102 has failed so that the front wheel torque, i.e., the torque supplied to the front wheels LF, RF, remains substantially constant. The controller 104 is able to determine if the all-wheel drive system 102 is in a failure mode based at least upon the signals received from the engine 106, the crankshaft sensor 128, the gear position sensor 132, the shaft sensor 140, the transmission output shaft sensor 142, the oil pump motor 144, the temperature sensor 146, and the ground speed sensor 148. It will be appreciated that the controller 104 could also determine that the all-wheel drive system 102 is in a failure mode based upon other signals received from different sensors not specifically described herein.

The controller 104 is configured to adjust the torque output from the crankshaft 126 of the engine 106 upon receiving what the controller 104 determines to be a failure signal so that the torque of the front wheels LF, RF remains approximately constant, by according to one aspect, determining the adjusted crankshaft torque with the following equation: ACT=CFWT/(GR×E)/TCG. The symbol ACT equals the adjusted crankshaft torque, the symbol CFWT equals a calculated front wheel torque, the symbol GR equals a transmission gear ratio, the symbol E equals a transmission efficiency, and the symbol TCG equals a torque converter gain.

The controller 104 controls the all-wheel drive system 102 so that a value of the rear wheel torque, i.e., the torque at the rear wheels LR, RR, equals approximately zero subsequent to the controller 104 determining that the all-wheel drive system 102 has failed. Thus, the torque supplied to the front wheels LF, RF is greater than the torque supplied to the rear wheels LR, RR. The controller 104 is configured to adjust the torque from the crankshaft 126 by adjusting operating parameters of the engine 106. For example, to reduce the torque from the crankshaft 126, the controller 104 could reduce the amount of fuel supplied to the engine 106 or retard the timing of the engine 106. By reducing the crankshaft torque, the controller 104 ensures that the front wheels LF, RF do not receive a dramatic increase in torque when the torque originally destined for the rear wheels LR, RR is redistributed to the front wheels when the all-wheel drive system 102 fails.

The controller 104 can include a number of look-up tables. These look-up tables may include the transmission gear ratio, the transmission efficiency, and the torque converter gain. The torque converter gain is based upon a rotational speed of the torque converter 134. The rotational speed of the torque converter 134 can be determined either from actual measurement or by calculation. The controller 104 is also configured to calculate the front wheel torque based upon the gear position and the crankshaft torque. The gear position is determined based upon a signal received from the gear position sensor 132 and the crankshaft torque is determined based upon a signal from the crankshaft sensor 128.

Figure 2:
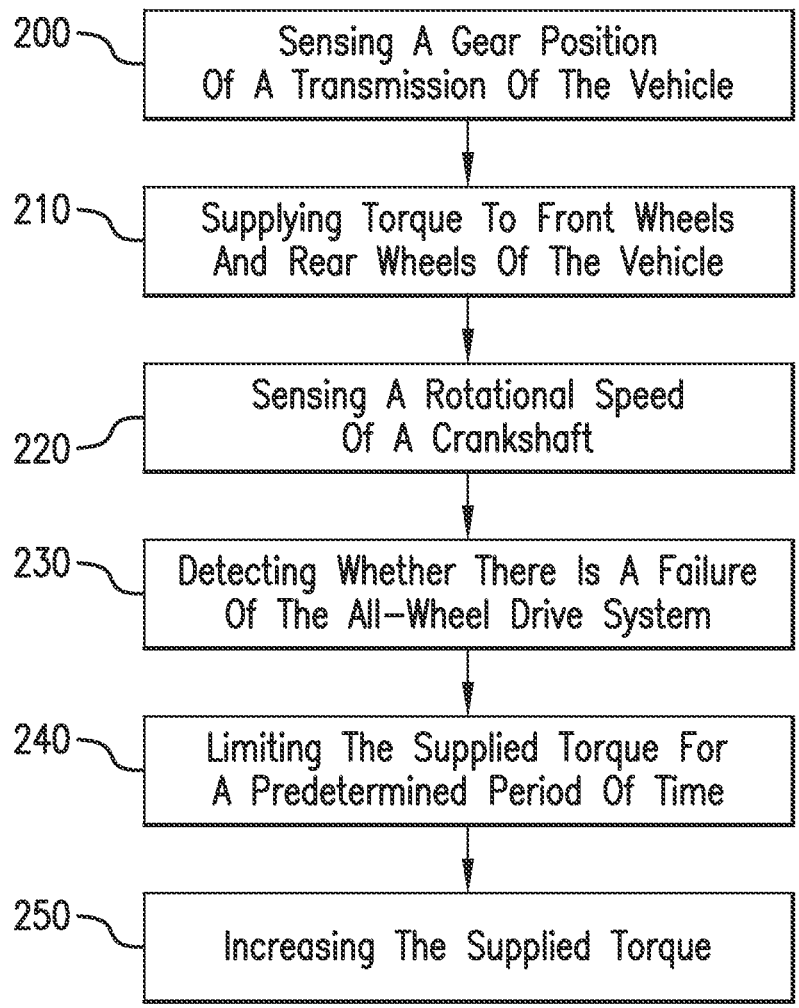
FIG. 2 is a flow chart illustrating a method of controlling a vehicle with an all-wheel drive system according to one aspect of the present disclosure.
Figure 3:
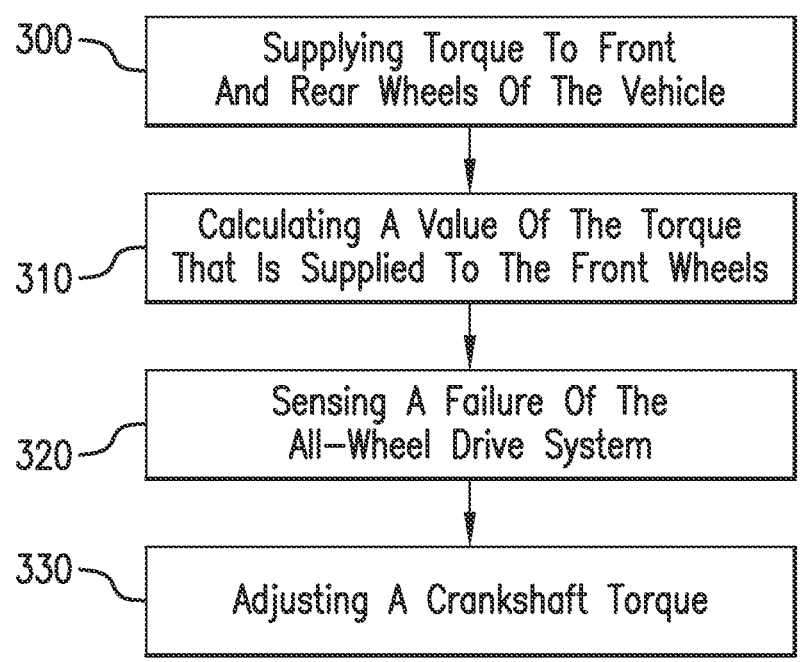
FIG. 3 is a flow chart illustrating a method of controlling an all-wheel drive system of a vehicle according to another aspect of the present disclosure.

With reference to FIGS. 2 and 3, a method of controlling a vehicle with an all-wheel drive system and a method of controlling an all-wheel drive system of a vehicle, are shown. While, for purposes of simplicity of explanation, the methods have steps shown and described as executing serially, it is to be understood and appreciated that the present invention is not limited by the illustrated order, as some steps could occur in different orders and/or concurrently with other steps from those shown and described herein.

With reference to FIG. 2, an exemplary method of controlling the vehicle 100 with the all-wheel drive system 102 is illustrated. In Step 200, a gear position of the transmission 108 is determined by the controller 104 receiving a gear position signal from the gear position sensor 132. In Step 210, torque is supplied to front wheels LF, RF and rear wheels LR, RR in a manner as previously described. In Step 220, a rotational speed of the crankshaft 126 is sensed by the crankshaft sensor 128. By sensing the rotational speed of the crankshaft 126, the controller 104 can determine the engine torque. In Step 230, detection of whether there is a failure of the all-wheel drive system 102 occurs by the controller 104 analyzing the signals received from the engine 106, the crankshaft sensor 128, the gear position sensor 132, the shaft sensor 140, the transmission output shaft sensor 142, the oil pump motor 144, the temperature sensor 146, and the ground speed sensor 148. In Step 240, the supplied torque to the front and rear wheels LF, RF, LR, RR is limited for a predetermined period of time after a failure of the all-wheel drive system 102 is detected. The torque can be limited by adjusting the rotational speed of the crankshaft 126. As will be appreciated, the rotational speed of the crankshaft 126 is not directly controlled. Rather, the rotational speed of the crankshaft 126 is indirectly controlled by any number of methods, including for example, by adjusting throttle, by adjusting fuel injection, and/or by adjusting spark timing. Further, the limited torque supplied to the front wheels LF, RF is based upon the gear position of the vehicle 100 and the torque output from the crankshaft 128. The predetermined time period can be anywhere from one to approximately five seconds, with a general duration of about three seconds. This provides a sufficient time for the driver of the vehicle 100 to adjust to the failure of the all-wheel drive system 102. By taking into account the gear position of the transmission 108 and the amount of torque output by the crankshaft 126, the proper amount of torque can be supplied to the front wheels LF, RF, thereby ensuring smooth operation of the vehicle 100.

The limited torque supplied to the rear wheels LR, RR during the predetermined period of time is equal to approximately zero. After the predetermined time period, the torque from the crankshaft 126 is increased at a predetermined rate until it is equal to the crankshaft torque prior to the failure of the all-wheel drive system 102. Naturally, this outcome is based upon no other system or diver-input changes. According to one aspect, this predetermined rate is about 1.5 Newton-meters per ten milliseconds. It is noted that the crankshaft torque can be controlled by controlling the rotational speed of the crankshaft 126 with the controller 104, as described hereinbefore.

With reference to FIG. 3, an exemplary method of controlling the all-wheel drive system 102 with the vehicle 100 is shown. In Step 300, torque is supplied to the front and rear wheels LF, RF, LR, RR of the vehicle 100 in a manner as previously described. In Step 310, a value of the torque that is supplied to the front wheels LF, RF is calculated based upon the signals received by the controller 104 from the gear position sensor 132 and the crankshaft sensor 128. In Step 320, a failure of the all-wheel drive system 102 is sensed by the controller 104 analyzing the signals received from the engine 106, the crankshaft sensor 128, the gear position sensor 132, the shaft sensor 140, the transmission output shaft sensor 142, the oil pump motor 144, the temperature sensor 146, and the ground speed sensor 148. In Step 330, the torque supplied by the crankshaft 126 of the engine 106 is adjusted so that the front wheel torque remains constant regardless of the failure of the all-wheel drive system 102. The crankshaft torque can be adjusting by changing the rotational speed of the crankshaft 126. The torque supplied to the front wheels LF, RF subsequent to a failure of the all-wheel drive system 102 is greater than the torque supplied to the rear wheels LR, RR subsequent to a failure of the all-wheel drive system 102. The crankshaft torque may be adjusted so that a value of the torque supplied to the rear wheels LR, RR subsequent to a failure of the all-wheel drive system 102 is equal to approximately zero. Further, the adjusted crankshaft torque can be determined based upon the calculated front wheel torque. The transmission gear ratio, the transaxle efficiency, and the torque converter gain can be determined from the look-up table. The torque converter gain is based upon a rotational speed of the torque converter 134 of the vehicle 100.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of controlling an all-wheel drive system of a vehicle, comprising:
supplying torque from an engine of the vehicle to front and rear wheels of the vehicle;
sensing a failure of the all-wheel drive system with a sensor;
adjusting a crankshaft torque of the engine with a controller so that the front wheel torque remains constant regardless of a failure of the all-wheel drive system;
calculating a value of the torque that is supplied to the front wheels prior to a failure of the all-wheel drive system; and
determining the adjusted crankshaft torque based upon the calculated front wheel torque.

2. The method of controlling an all-wheel drive system of a vehicle of claim 1, wherein the torque supplied to the front wheels subsequent to a failure of the all-wheel drive system is greater than the torque supplied to the rear wheels subsequent to a failure of the all-wheel drive system.

3. The method of controlling an all-wheel drive system of a vehicle of claim 2, further including
adjusting the crankshaft torque so that a value of the torque supplied to the rear wheels subsequent to a failure of the all-wheel drive system is equal to zero.

4. The method of controlling an all-wheel drive system of a vehicle of claim 1, wherein the adjusted crankshaft torque is determined by the equation: $ACT=CFWT/(GR \times E)/TCG$, and wherein ACT equals the adjusted crankshaft torque, CFWT equals a calculated front wheel torque, GR equals a transmission gear ratio, E equals a transmission efficiency, and TCG equals a torque converter gain.

5. The method of controlling an all-wheel drive system of a vehicle of claim 4, further including
determining the transmission gear ratio, the transmission efficiency, and the torque converter gain from a look-up table, wherein the torque converter gain is based upon a rotational speed of a torque converter of the vehicle.

6. The method of controlling an all-wheel drive system of a vehicle of claim 4, wherein the calculated front wheel torque is based upon a crankshaft torque of the vehicle and a gear position of a transmission of the vehicle.

7. A method of controlling a vehicle with an all-wheel drive system, comprising:
sensing a gear position of a transmission of the vehicle;
supplying torque of a crankshaft of an engine to front wheels and rear wheels of the vehicle;
sensing a rotational speed of the crankshaft;
detecting whether there is a failure of the all-wheel drive system with a sensor; and
limiting the supplied torque to the front wheels for a predetermined time period after a failure of the all-wheel drive system is detected, wherein the limited torque supplied to the front wheels is based upon the gear position of the transmission and the rotational speed of the crankshaft, wherein the limited torque supplied to the rear wheels during the predetermined time period is equal to zero, and wherein subsequent to the predetermined time period, the crankshaft torque is increased at a predetermined rate until being equal to the crankshaft torque prior to the failure of the all-wheel drive system.

8. The method of controlling an all-wheel drive system of a vehicle of claim 7, wherein the predetermined time period is about three seconds.

9. The method of controlling an all-wheel drive system of a vehicle of claim 7, wherein the predetermined rate is about 1.5 Newton-meters per 10 milliseconds.

10. The method of controlling an all-wheel drive system of a vehicle of claim 7, wherein the limited torque supplied to the front wheels is controlled by reducing a rotational speed of an engine of the vehicle.

11. A vehicle, comprising:
an all-wheel drive system including
an engine that outputs crankshaft torque through a crankshaft,
a transmission that is coupled to the engine and supplies front wheel torque to front wheels of the vehicle,
a propeller shaft rotated by the transmission, and
a rear differential unit powered by the propeller shaft and supplies rear wheel torque to rear wheels of the vehicle;
an oil pump motor associated with the rear differential unit;
a temperature sensor that is configured to sense a temperature within the rear differential unit; and
a controller that controls operation of the all-wheel drive system and is configured to receive signals indicative of a failure of the all-wheel drive system, wherein the controller is configured to adjust the crankshaft torque upon receiving a failure signal so that the front wheel torque remains constant during a predetermined time period in which the failure of the all-wheel drive system occurs, wherein the controller is configured to receive signals from the oil pump motor and the temperature sensor, and wherein the controller is configured to determine if a failure of the all-wheel drive system has occurred based upon the signals from the oil pump motor and the temperature sensor.

12. The vehicle of claim 11, wherein the controller adjusts the crankshaft torque upon receiving a failure signal so that the front wheel torque remains constant by determining the adjusted crankshaft torque with the equation: $ACT=CFWT/(GR \times E)/TCG$, and wherein ACT equals the adjusted crankshaft torque, CFWT equals a calculated front wheel torque, GR equals a transmission gear ratio, E equals a transmission efficiency, and TCG equals a torque converter gain.

13. The vehicle of claim 12, further including a torque converter disposed in the transmission and a torque converter speed sensor configured to sense a rotational speed of the torque converter and send a signal indicative of the rotational speed of the torque converter to the controller.

14. The vehicle of claim 13, wherein the controller includes a lookup table including a transmission gear ratio, a transmission efficiency, and a torque converter gain, and wherein the torque converter gain is based upon the torque converter rotational speed signal.

15. The vehicle of claim 12, further including
a gear position sensor configured to sense a gear position of the transmission and send a gear position signal to the controller, and
a crankshaft sensor configured to sense a rotational speed of the crankshaft and send a crankshaft speed signal to the controller, wherein the controller is configured to calculate front wheel torque based upon the gear position signal and the crankshaft speed signal.

16. The vehicle of claim 11, wherein the controller controls the all-wheel drive system so that a value of the rear wheel torque equals zero subsequent to the controller receiving a signal indicative of a failure of the all-wheel drive system.

\* \* \* \* \*